(12) United States Patent
Hunt et al.

(10) Patent No.: US 12,714,016 B2
(45) Date of Patent: Aug. 25, 2026

(54) AGRICULTURAL DISC MOWER WITH FULLY REVERSIBLE KNIFE

(71) Applicant: CNH Industrial America LLC, New Holland, PA (US)

(72) Inventors: Cory Hunt, Millersville, PA (US); Carmelo Abreu, Reinholds, PA (US)

(73) Assignee: CNH Industrial America LLC, New Holland, PA (US)

( * ) Notice: Subject to any disclaimer, the term of this patent is extended or adjusted under 35 U.S.C. 154(b) by 783 days.

(21) Appl. No.: 18/075,104

(22) Filed: Dec. 5, 2022

(65) Prior Publication Data

US 2024/0180074 A1 Jun. 6, 2024

(51) Int. Cl.
*A01D 34/63* (2006.01)
*A01D 34/66* (2006.01)

(52) U.S. Cl.
CPC ............. *A01D 34/63* (2013.01); *A01D 34/66* (2013.01)

(58) Field of Classification Search
CPC ...... A01D 34/63; A01D 34/66; A01D 34/664; A01D 34/733; A01D 34/736
USPC .......................................... 56/295, 12.7, 255
See application file for complete search history.

(56) References Cited

U.S. PATENT DOCUMENTS 3,103,093 A * 9/1963 House, Jr. ............ A01D 34/736 56/295
3,243,944 A * 4/1966 Michaud ............. A01D 34/733 56/295
3,395,522 A * 8/1968 Zweegers ............. A01D 34/86 56/295
3,507,104 A * 4/1970 Kline .................. A01D 34/733 56/295
5,438,819 A * 8/1995 Dallman ............. A01D 34/866 56/295
6,829,878 B1 12/2004 Hoffman
11,716,929 B2 * 8/2023 Matsuzawa .......... A01D 34/733 56/255
12,171,161 B2 * 12/2024 Nielsen ............... A01D 34/733

(Continued)

FOREIGN PATENT DOCUMENTS

AU 2700292 A * 4/1993 ........... A01D 34/005
CN 10-2016-0035938 4/2016

(Continued)

OTHER PUBLICATIONS

Extended European Search Report for Application No. 23214372.7 dated Apr. 25, 2024 (eight pages).

(Continued)

*Primary Examiner* — Joseph M Rocca
*Assistant Examiner* — Sunny D Webb
(74) *Attorney, Agent, or Firm* — Buchanan Ingersoll & Rooney PC

(57) ABSTRACT

A disc cutter for an agricultural implement includes: a disc body configured to rotate in a rotation direction; a knife mount carried by the disc body and including a body mounting feature; and a knife coupled to the knife mount. The knife includes: a pair of cutting sections each having a knife mounting feature disposed on or in a knife surface between a pair of edges of the cutting sections and configured to couple with the body mounting feature, each of the edges defining a cutting angle with respect to the knife surface such that the edges extend in parallel.

17 Claims, 7 Drawing Sheets

(56) References Cited

U.S. PATENT DOCUMENTS

| | | | | |
|---|---|---|---|---|
| 2007/0277492 | A1* | 12/2007 | Ekis | A01D 34/736 56/12.1 |
| 2009/0223193 | A1* | 9/2009 | Funnell | A01D 34/73 56/17.5 |
| 2013/0247530 | A1 | 9/2013 | Heinrich | |
| 2018/0139901 | A1 | 5/2018 | Teko et al. | |
| 2019/0069479 | A1* | 3/2019 | Robb | A01D 34/73 |
| 2021/0185911 | A1* | 6/2021 | Agerhall | A01D 34/733 |

FOREIGN PATENT DOCUMENTS

| | | | | | |
|---|---|---|---|---|---|
| DE | 38 38 427 | A1 | | 5/1990 | |
| DE | 29916598 | U1 | | 7/2000 | |
| EP | 0 603 086 | B1 | | 3/1997 | |
| EP | 2912935 | A1 | | 9/2015 | |
| EP | 2939517 | A1 | | 11/2015 | |
| EP | 2497353 | B1 | | 11/2017 | |
| GB | 1460224 | A | * | 12/1976 | A01D 34/736 |
| GB | 2001836 | A | * | 2/1979 | A01D 34/661 |
| GB | 2369765 | A | * | 6/2002 | A01D 34/736 |
| WO | WO-9529577 | A2 | * | 11/1995 | A01D 34/73 |

OTHER PUBLICATIONS

Extended European Search Report for EP Application No. 23216464.0 dated May 14, 2024 (eight pages).

* cited by examiner

AGRICULTURAL DISC MOWER WITH FULLY REVERSIBLE KNIFE

FIELD OF THE INVENTION

The present invention pertains to agricultural implements and, more specifically, to disc cutters for agricultural mowing devices.

BACKGROUND OF THE INVENTION

Mowers and mower conditioners are often employed to cut crop material, such as hay or grass, and deposit the cut crop into windrows in a field. For cutting smaller fields, a single pull-type mower or mower conditioner may be attached to the rear of an agricultural driving vehicle. For cutting large fields, the driving vehicle may push a front mounted mower or mower conditioner and optionally tow an additional rear mounted mower or mower conditioner.

A typical mower generally includes a frame, a hitch coupled to the vehicle, and a cutter bar such as a sickle bar or rotary disc cutter bar for severing the crop from the field. The mower may further include other elements such as a reel to assist crop feeding, an auger or belts to convey crop to a central discharge point, and a flail or set of rollers for conditioning crop as it is ejected rearwardly out of the mower. A disc cutter bar generally includes multiple juxtaposed cutterheads for cutting the standing crop. Each cutterhead may consist of a rotating disc with cutting blades or knives affixed to the body of the disc.

The knives of a cutter bar are known wear items that are intended to be replaced or repaired with some frequency. While it is known that knives need to be replaced or repaired, it is inconvenient to replace or repair the knives. Many users do not want to carry replacement knives or repair tools with the mower, which requires the mower to be brought to a service area for knife replacement or repair and increases downtime of the mower. The alternative is to operate the machine with a dull or broken knife edge, which can result in poor cut quality.

What is needed in the art is a way to reduce down time associated with replacing knives on an agricultural machine.

SUMMARY OF THE INVENTION

Exemplary embodiments disclosed herein provide disc cutters with a knife that is structured so four edges of the knife can be used as cutting edges, allowing the knife to be flipped and rotated before replacing the knife.

In some exemplary embodiments provided according to the present disclosure a disc cutter for an agricultural implement includes: a disc body configured to rotate in a rotation direction; a knife mount carried by the disc body and including a body mounting feature; and a knife coupled to the knife mount. The knife includes: a first cutting section having a first knife mounting feature disposed on or in a first knife surface between a pair of first edges of the first cutting section and configured to couple with the body mounting feature, each of the first edges defining a first cutting angle with respect to the first knife surface such that the first edges extend in parallel; and a second cutting section having a second knife mounting feature disposed on or in a second knife surface between a pair of second edges of the second cutting section and configured to couple with the body mounting feature, each of the second edges defining a second cutting angle with respect to the second knife surface such that the second edges extend in parallel.

In some exemplary embodiments provided according to the present disclosure, a cutter bar for an agricultural implement includes a frame and a plurality of disc cutters carried by the frame. At least one of the disc cutters includes: a disc body configured to rotate in a rotation direction; a knife mount carried by the disc body and including a body mounting feature; and a knife coupled to the knife mount. The knife includes: a first cutting section having a first knife mounting feature disposed on or in a first knife surface between a pair of first edges of the first cutting section and configured to couple with the body mounting feature, each of the first edges defining a first cutting angle with respect to the first knife surface such that the first edges extend in parallel; and a second cutting section having a second knife mounting feature disposed on or in a second knife surface between a pair of second edges of the second cutting section and configured to couple with the body mounting feature, each of the second edges defining a second cutting angle with respect to the second knife surface such that the second edges extend in parallel.

In some exemplary embodiments provided according to the present disclosure, an agricultural mowing assembly includes an agricultural vehicle and an agricultural implement coupled to the agricultural vehicle. The agricultural implement has a cutter bar that includes a frame and a plurality of disc cutters carried by the frame. At least one of the disc cutters includes: a disc body configured to rotate in a rotation direction; a knife mount carried by the disc body and including a body mounting feature; and a knife coupled to the knife mount. The knife includes: a first cutting section having a first knife mounting feature disposed on or in a first knife surface between a pair of first edges of the first cutting section and configured to couple with the body mounting feature, each of the first edges defining a first cutting angle with respect to the first knife surface such that the first edges extend in parallel; and a second cutting section having a second knife mounting feature disposed on or in a second knife surface between a pair of second edges of the second cutting section and configured to couple with the body mounting feature, each of the second edges defining a second cutting angle with respect to the second knife surface such that the second edges extend in parallel.

An advantage that may be realized by exemplary embodiments provided according to the present disclosure is that the knife having four cutting edges allows the knife to be flipped or rotated, rather than replaced, to provide a sharp cutting edge.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural vehicle or mowing device and/or components thereof are usually determined with reference to the direction of forward operative travel, but they should not be construed as limiting. The terms "longitudinal" and "transverse" are determined with reference to the fore-and-aft direction of the agricultural vehicle or mowing device and are equally not to be construed as limiting. The terms "downstream" and "upstream" are determined with reference to the intended direction of crop material flow during operation, with "downstream" being analogous to "rearward" and "upstream" being analogous to "forward." As used herein, the term "mowing device" may refer to any agricultural cutting device that severs crop from the field, including a mower, a mower conditioner, or a cutter bar for a forage harvester or combine.

Figure 1:
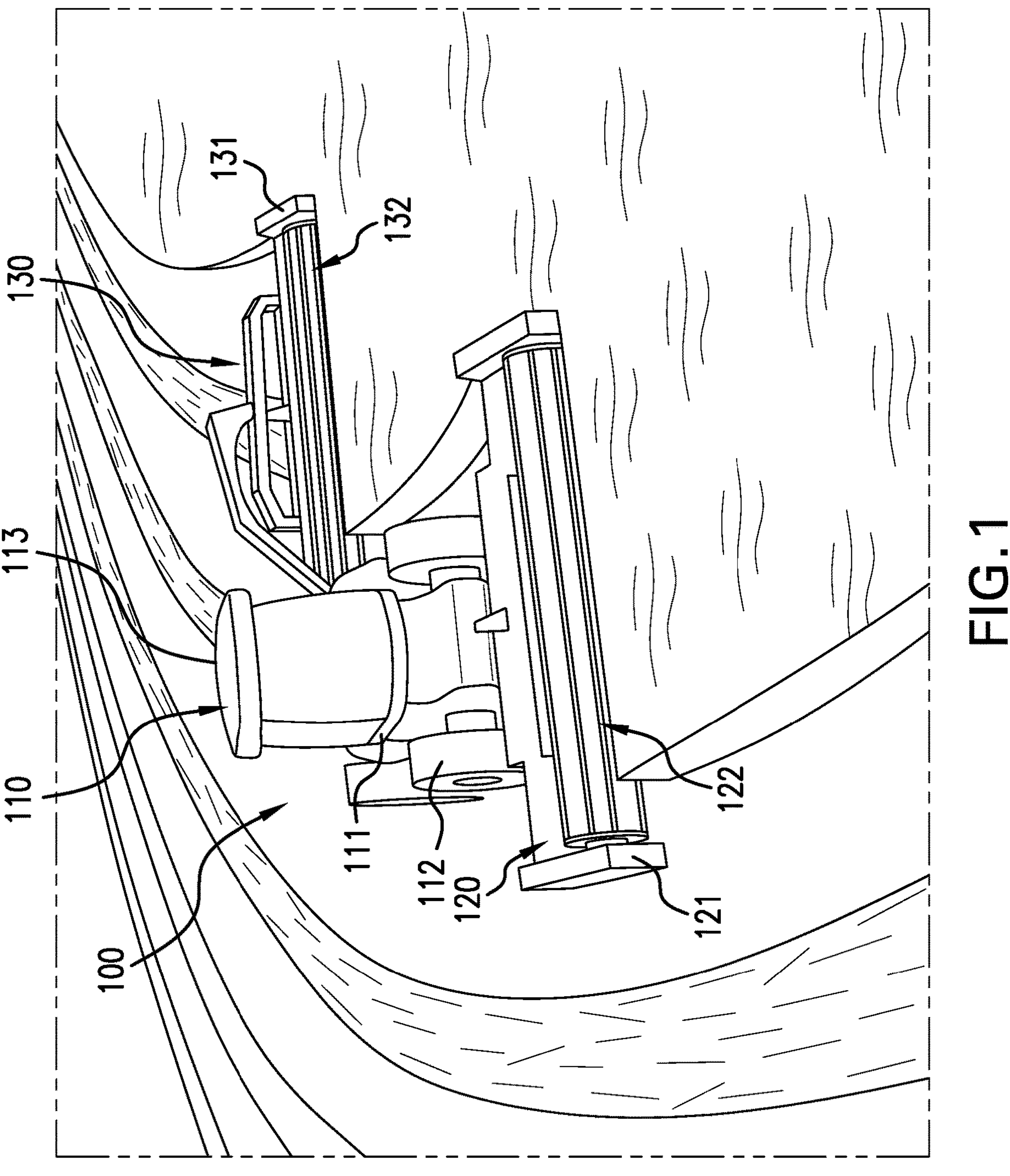
FIG. 1 illustrates a perspective view of an exemplary embodiment of an agricultural mowing assembly including an agricultural vehicle and an agricultural implement provided according to the present disclosure.
Figure 2:
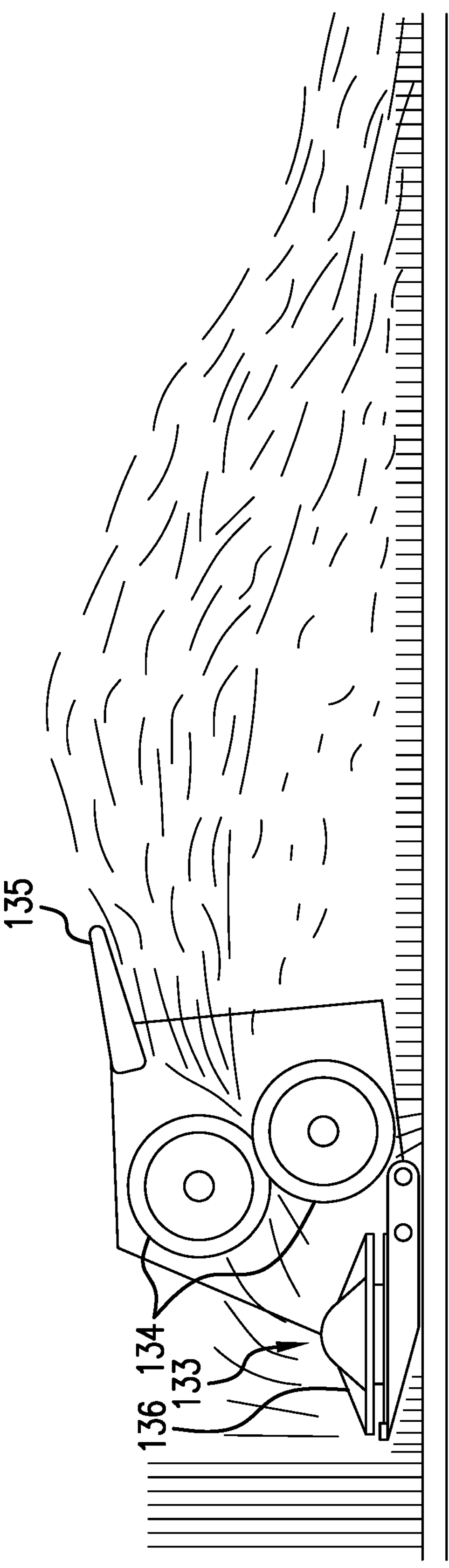
FIG. 2 illustrates a side sectional view of the agricultural implement of FIG. 1.

Referring now to the drawings, and more particularly to FIGS. 1-2, there is shown an agricultural mowing assembly 100 which includes an agricultural vehicle 110 and at least one agricultural implement illustrated in the form of two mowing devices 120, 130 coupled to the agricultural vehicle 110. The agricultural mowing assembly 100 may include tandem front and rear mowing devices 120, 130, which operate in tandem to cut crop from the field. It should be appreciated that while only two mowers 120, 130 are illustrated and described herein, the present disclosure is equally applicable to mowing assemblies that incorporate only one mowing device or more than two mowing devices.

The agricultural vehicle 110 generally includes a chassis 111, a prime mover, wheels and/or tracks 112, and a cab 113 for housing the operator. The chassis 111 may at least partially carry the front and rear mowing devices 120, 130. The vehicle 110 can be in the form of a tractor, self-propelled windrower, or any other desired agricultural vehicle.

The front and rear mowing devices 120, 130 are connected to the chassis 111 of the agricultural vehicle 110. The front mowing device 120, for example, may be centrally mounted onto the driving vehicle 110 such that the agricultural vehicle 110 carries the front mowing device 120. The rear mowing device 130 may be coupled to a tongue coupler on the chassis 111 by a pivotable tongue that can change the angular position of the rear mowing device 130 relative to the forward direction of travel. As shown, the mowing devices 120, 130 are in the form of mower conditioners; however, the mowing devices 120, 130 can be in the form of any desired mowing devices such as mowers, windrowers, cutter bars, or windrow inverters. Each mowing device 120, 130 may include a frame 121, 131, a reel 122, 132 with tines rotatably connected to the frame 121, 131, a cutter bar 133, a conditioner 134, e.g. at least one flail conditioner or at least two conditioning rollers 134, and/or a crop gate 135, e.g. swath gate and/or windrow forming shields, for directing the crop material out of the mowing device 120, 130 and onto the field in a windrow or swath (as shown in FIG. 2 with respect to the rear mowing device 130). The illustrated cutter bar 133 is in the form of a rotary disc cutter bar 133 with multiple disc cutters 136 carried by a frame of the cutter bar 133.

Figure 3:
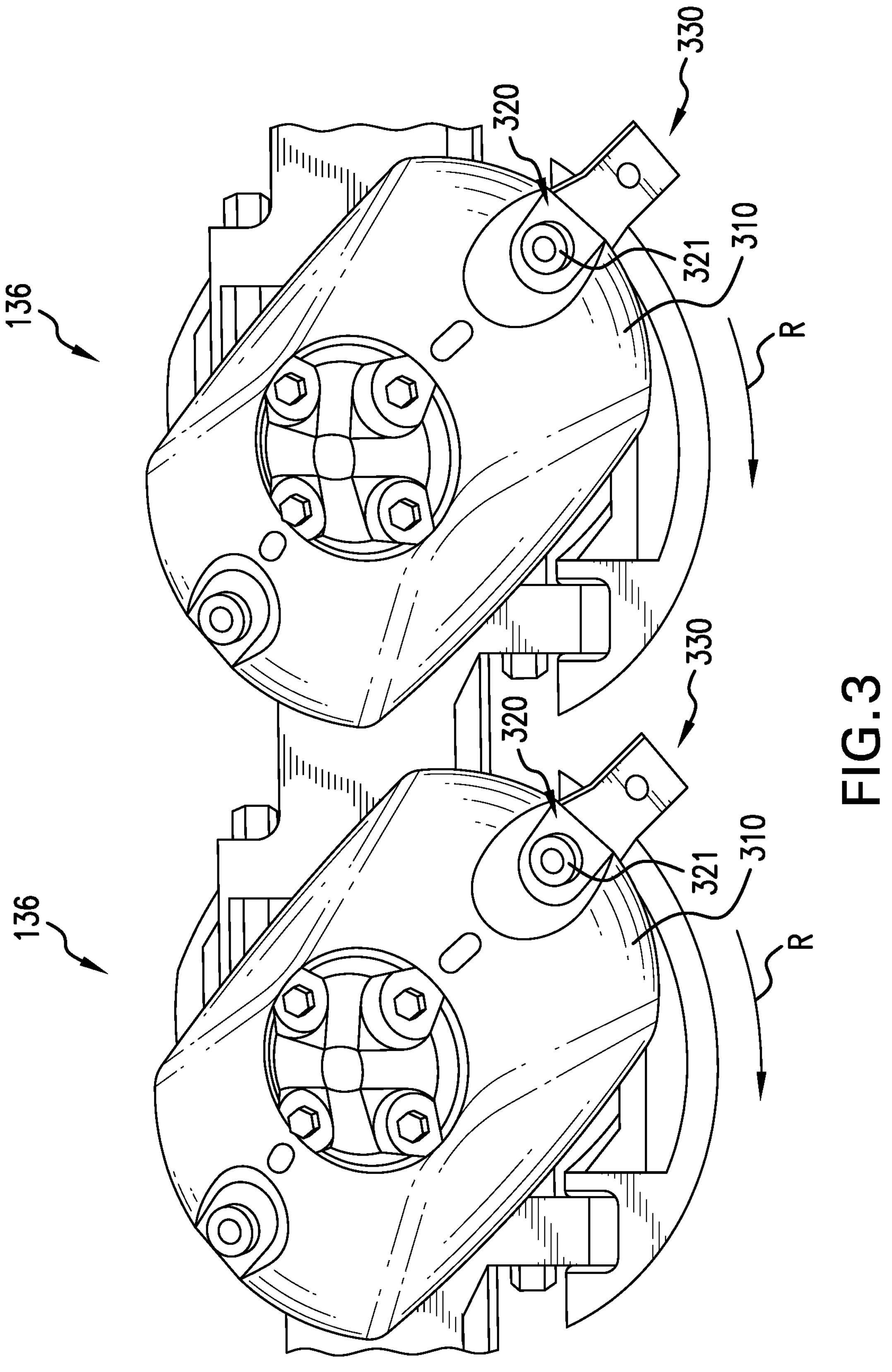
FIG. 3 illustrates a perspective view of an exemplary embodiment of disc cutters provided according to the invention including a knife.

Referring now to FIG. 3, two of the disc cutters 136 are illustrated. Each of the disc cutters 136 includes a disc body 310 configured to rotate in a rotation direction R, a knife mount 320 carried by the disc body 310 that includes a body mounting feature 321, and a knife 330 coupled to the knife mount 320. It should be appreciated that while two disc cutters 136 are illustrated in FIG. 3, one disc cutter or more than two disc cutters may be included in the cutter bar 133 provided according to the present disclosure. Further, while FIG. 3 only illustrates one knife 330 for each disc cutter 136, the disc cutters 136 may carry more than one knife, e.g., two knives, three knives, four knives, etc.

Many known knives have two cutting edges. The knife having two cutting edges allows the knife to be flipped or rotated when one of the cutting edges is dull and/or broken so the sharp cutting edge can be used to cut crop material. While such knives are effective and convenient for a farmer, the knives can only be rotated or flipped once before replacement is required.

To address some of the issues with known knives, and referring now to FIGS. 4-7, the knife 330 provided according to the present disclosure includes a first cutting section 410 and a second cutting section 420. It should be appreciated that while only one of the knives 330 is illustrated in FIGS. 4-7, all of the knives of the cutter bar 133 may be similar. The first cutting section 410 includes a first knife mounting feature 411 disposed on or in a first knife surface 412 between a pair of first edges 413, 414 of the first cutting section 410. The first knife mounting feature 411 is configured to couple with the body mounting feature 321, which mounts the knife 330 to the knife mount 320. Each of the first edges 413, 414 is sharpened so as to define a first cutting angle $\alpha 1$ with respect to the first knife surface 412 such that the first edges 413, 414 extend in parallel, which is especially apparent in cross-section as illustrated in FIG. 4A. Similarly, the second cutting section 420 includes a second knife mounting feature 421 disposed on or in a second knife surface 422 between a pair of second edges 423, 424 of the second cutting section 420. The second knife mounting feature 421 is configured to couple with the body mounting feature 321, which can also mount the knife 330 to the knife mount 320. In this respect, either of the knife mounting features 411, 421 may be used to mount the knife 330 to the knife mount 320, the significance of which will be described further herein. Each of the second edges 423, 424 is sharpened so as to define a second cutting angle $\alpha 2$ with respect to the second knife surface 422 such that the second edges 423, 424 extend in parallel, which is especially apparent in cross-section as illustrated in FIG. 4B. The knife 330 may, for example, be formed of a metal or other high-strength material that can be ground or otherwise sharpened to produce the cutting edges 413, 414, 423, 424. An exemplary material includes, but is not limited to, hardened steel. In some embodiments, one or more of the edges 413, 414, 423, 424 is coated with a high toughness material to further toughen the edges 413, 414, 423, 424 for cutting. Exemplary high toughness materials include, but are not limited to, carbides such as tungsten carbide. It should therefore be appreciated that the knife 330 can be formed from a variety of different materials.

Figure 4:
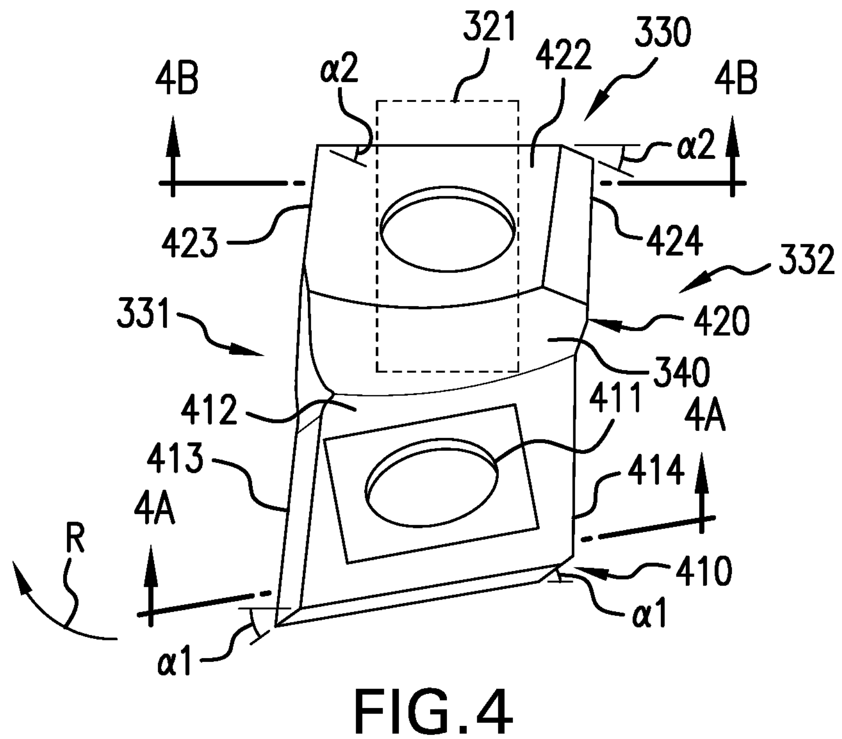
FIG. 4 illustrates a perspective view of one of the knives of FIG. 3 in a first orientation.
Figure 5:
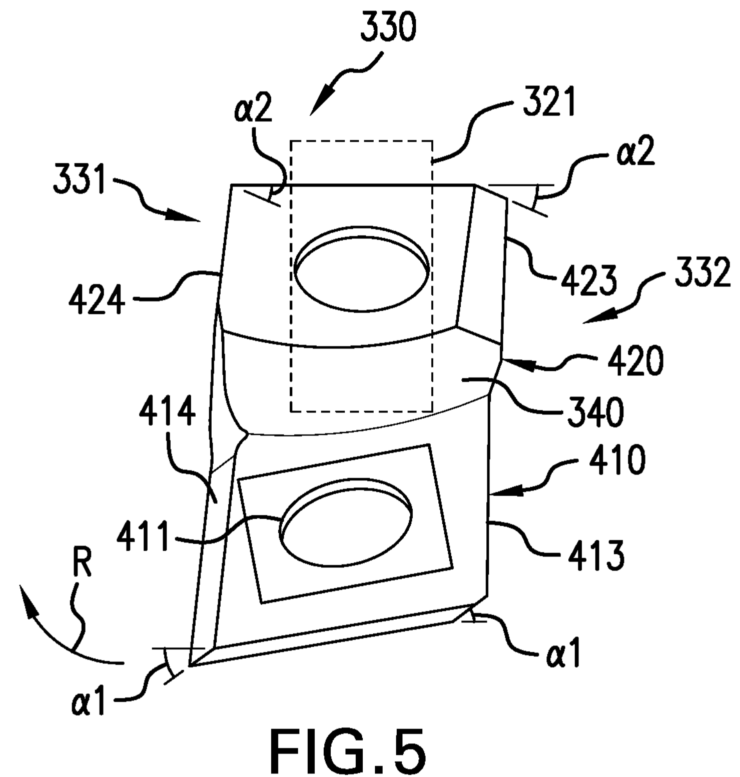
FIG. 5 illustrates a perspective view of the knife of FIG. 4 after flipping the knife to a second orientation from the first orientation illustrated in FIG. 4.
Figure 4A:
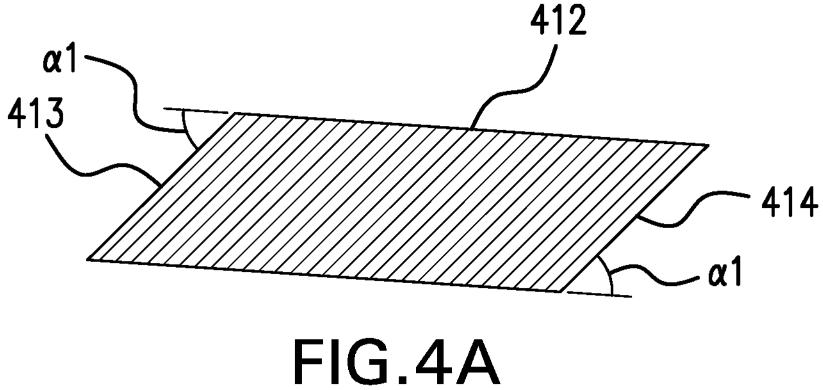
FIG. 4A illustrates a cross-section of the knife of FIG. 4 taken along line 4A-4A.
Figure 4B:
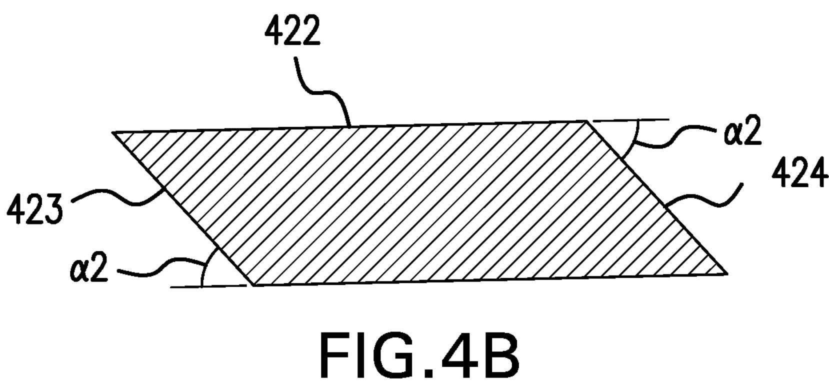
FIG. 4B illustrates a cross-section of the knife of FIG. 4 taken along line 4B-4B.

Referring specifically now to FIGS. 4-5, the knife 330 is illustrated in a first orientation in FIG. 4 and a second orientation in FIG. 5. In the first orientation, the first edge 413 and the second edge 423 are on a leading side 331 of the knife 330 and the other first edge 414 and the other second edge 424 are on a trailing side 332 of the knife 330. The leading side 331 and the trailing side 332 are described with respect to the rotation direction R that the knife 330 will rotate during operation. In the first orientation illustrated in FIG. 4, the first edge 413 on the leading side 331 of the knife 330 will be the cutting edge that tends to cut crop material while the other edges 414, 423, 424 will generally not cut crop material during rotation in the rotation direction R. When the knife 330 is flipped to the second orientation illustrated in FIG. 5, the first edge 414 and the second edge 424 are now on the leading side 331 of the knife and the other first edge 413 and the other second edge 423 are on the trailing side 332 of the knife 330 so the first edge 414 will be the cutting edge that tends to cut crop material while the other edges 413, 423, 424 will generally not cut crop material during rotation in the rotation direction R.

The knife 330 may be mounted to the knife mount 320 in both the first orientation and the second orientation by coupling the second knife mounting feature 421 to the body mounting feature 321. The knife 330 can be re-oriented by uncoupling the second knife mounting feature 421 from the body mounting feature 321 and then flipping the knife 330 before re-coupling the second knife mounting feature 421 to the body mounting feature 321. Re-orienting the knife 330 from the first orientation to the second orientation in this manner allows the cutting edge to be changed from the first edge 413 in the first orientation to the second edge 414 in the second orientation when, for example, the first edge 413 has become dull or otherwise damaged and a fresh cutting edge is desired. The first edges 413, 414 extending in parallel to each other ensures that the cutting edge is generally the same regardless of whether the knife 330 is in the first orientation or the second orientation.

Figure 6:
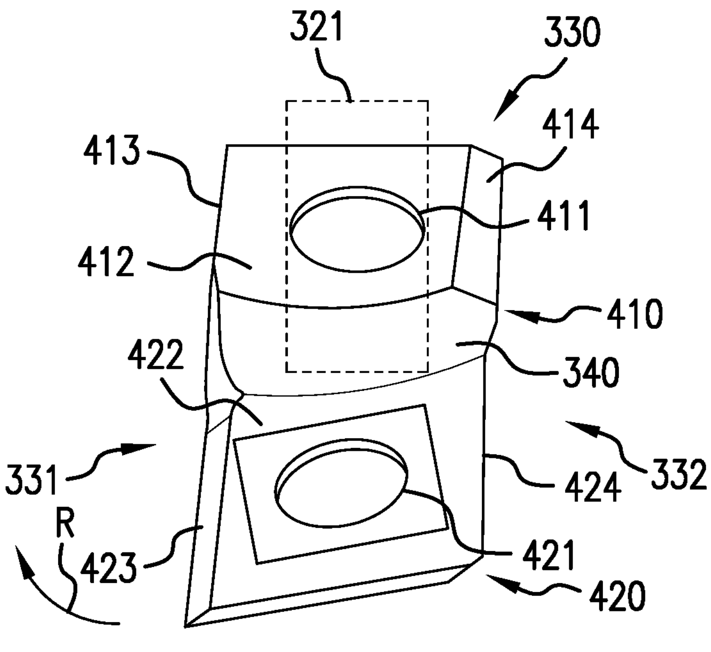
FIG. 6 illustrates a perspective view of the knife of FIGS. 4-5 after rotating the knife to a third orientation from the second orientation illustrated in FIG. 5.
Figure 7:
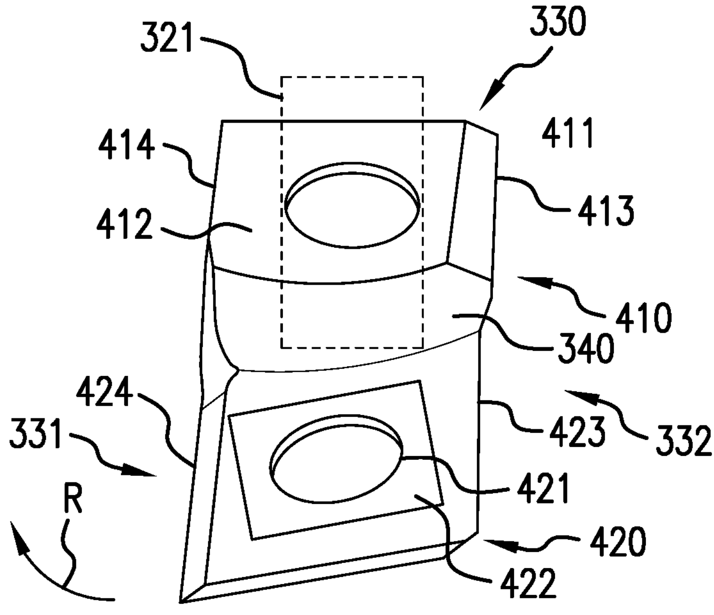
FIG. 7 illustrates a perspective view of the knife of FIGS. 4-6 after flipping the knife to a fourth orientation from the third orientation illustrated in FIG. 6.

Referring now to FIGS. 6 and 7 as well, the knife 330 is illustrated in a third orientation in FIG. 6 after rotating the knife 330 from the second orientation illustrated in FIG. 5 and in a fourth orientation in FIG. 7 after flipping the knife 330 from the third orientation illustrated in FIG. 6. As used herein, "rotating" differs from "flipping" in that rotating the knife 330 refers to rotation of the knife 330 about a point within a rotation plane while flipping refers to rotation of the knife 330 about the same point in a manner that moves the knife 330 out of the rotation plane. When the knife 330 is in the third orientation, the second edge 423 and the first edge 413 may be on the leading side 331 of the knife 330, similar to the first orientation, and the second edge 424 and the first edge 414 may be on the trailing side 332 of the knife 330, similar to the first orientation. However, unlike the first orientation, the second edge 423 will be the cutting edge that tends to cut crop material while the other edges 413, 414, 424 will not tend to cut crop material during rotation. This is due to the first knife mounting feature 411 being in a position to couple to the body mounting feature 321 so the first edges 413, 414 are shielded by the disc body 320 (best illustrated in FIG. 3) while the second edges 423, 424 are not shielded by the disc body 320. The knife 330 can be flipped from the third orientation to the fourth orientation so the second edge 424 and the first edge 414 are on the leading side 331 of the knife 330, similar to the second orientation, and the second edge 423 and the first edge 413 are on the trailing side 332 of the knife 330, similar to the second orientation, with the second edge 424 as the cutting edge that tends to cut crop material while the other edges 413, 414, 423 will not tend to cut crop material during rotation. It should thus be appreciated that each of the edges 413, 414, 423, 424 of the knife 330 can be used as a cutting edge by flipping and/or rotating the knife 330.

As previously described, the first edges 413, 414 extend in parallel so the first cutting angle $\alpha 1$ of the first edges 413, 414 is the same and the second edges 423, 424 extend in parallel so the second cutting angle $\alpha 2$ of the second edges 423, 424 is the same. In some embodiments, the first cutting angle $\alpha 1$ and the second cutting angle $\alpha 2$ are the same with respect to their respective knife surface 412, 422. The first cutting angle $\alpha 1$ and/or the second cutting angle $\alpha 2$ may be, for example, between 20° and 40°, such as 30°, relative to the respective knife surface 412, 422. It should be appreciated that the previously described cutting angles $\alpha 1$ and $\alpha 2$ are exemplary only. When the first cutting angle $\alpha 1$ and the second cutting angle $\alpha 2$ are the same, the cutting edge of the knife 330 in any orientation will generally be the same so the knife 330 has similar cutting properties regardless of whether the knife 330 is in the first, second, third, or fourth orientation and coupled to the knife mount 320. However, it should be appreciated that, in some embodiments, the cutting angles $\alpha 1$, $\alpha 2$ may differ so the cutting properties of the first edges 413, 414 differ from the second edges 423, 424. Providing different cutting properties on the same knife 330 allows a user to adjust the cut quality of the cutter discs 136 by rotating, rather than replacing, the knife 330.

In some embodiments, and as illustrated in FIGS. 3-7, the first knife mounting feature 411 and/or the second knife mounting feature 421 is an opening formed in the respective knife surface 412, 422. When the knife mounting features 411, 421 are formed as openings, the body mounting feature 321 may be a correspondingly sized and shaped protrusion that fits within the knife mounting features 411, 421 to mount the knife 330 to the knife mount 320. Many such mounting features are known and any suitable mounting feature may be utilized according to the present disclosure. It should be appreciated that while the knife mounting features 411, 421 are illustrated as openings formed in the respective knife surfaces 412, 422, in some embodiments the knife mounting features 411, 421 are formed as a protrusion that extends away from the respective knife surfaces 412, 422. When the knife mounting features are formed as protrusions, each cutting section 410, 420 may have two or more respective knife mounting features, at least one on each side of the cutting section 410, 420, so there is a knife mounting feature available to couple with the body mounting feature 321 regardless of the orientation of the knife 330. Alternatively, or in addition, the disc body 320 may have two or more body mounting features when the knife mounting features are protrusions, e.g., a body mounting feature disposed on opposite sides of the knife 330 when the knife 330 is coupled to the knife mount 320, to couple with the knife mounting features regardless of the orientation of the knife 330. Regardless of whether the knife mounting features 411, 421 are provided as openings and/or protrusions, the knife mounting features 411, 421 may each define a same size and a same shape, as illustrated, so the knife mounting features 411, 421 couple with the respective body mounting feature 321 in the same manner. It should thus be appreciated that the mounting features 321, 411, 421 provided according to the present disclosure may be configured in a variety of ways to mount the knife 330 to the knife mount 320 regardless of orientation.

In some embodiments, the knife 330 includes an offset 340 between the first knife surface 412 and the second knife surface 422. The offset 340 may be provided such that the first knife surface 412 and the second knife surface 422 are not co-planar with one another. Providing the knife 330 with the offset 340 allows the knife 330 to be mounted to the knife mount 320 in a manner that shields the cutting section 410, 420 coupled to the knife mount 320 while also providing stability of the exposed cutting section 410, 420 because the offset 340, or a section adjacent to the offset 340, can bear against the disc body 310, as best illustrated in FIG. 3. The offset 340 can also allow the knife mount 320 to be flat, as opposed to angle, if the knife 330 has an upward sweep to encourage crop flow away from the ground.

Figure 8:
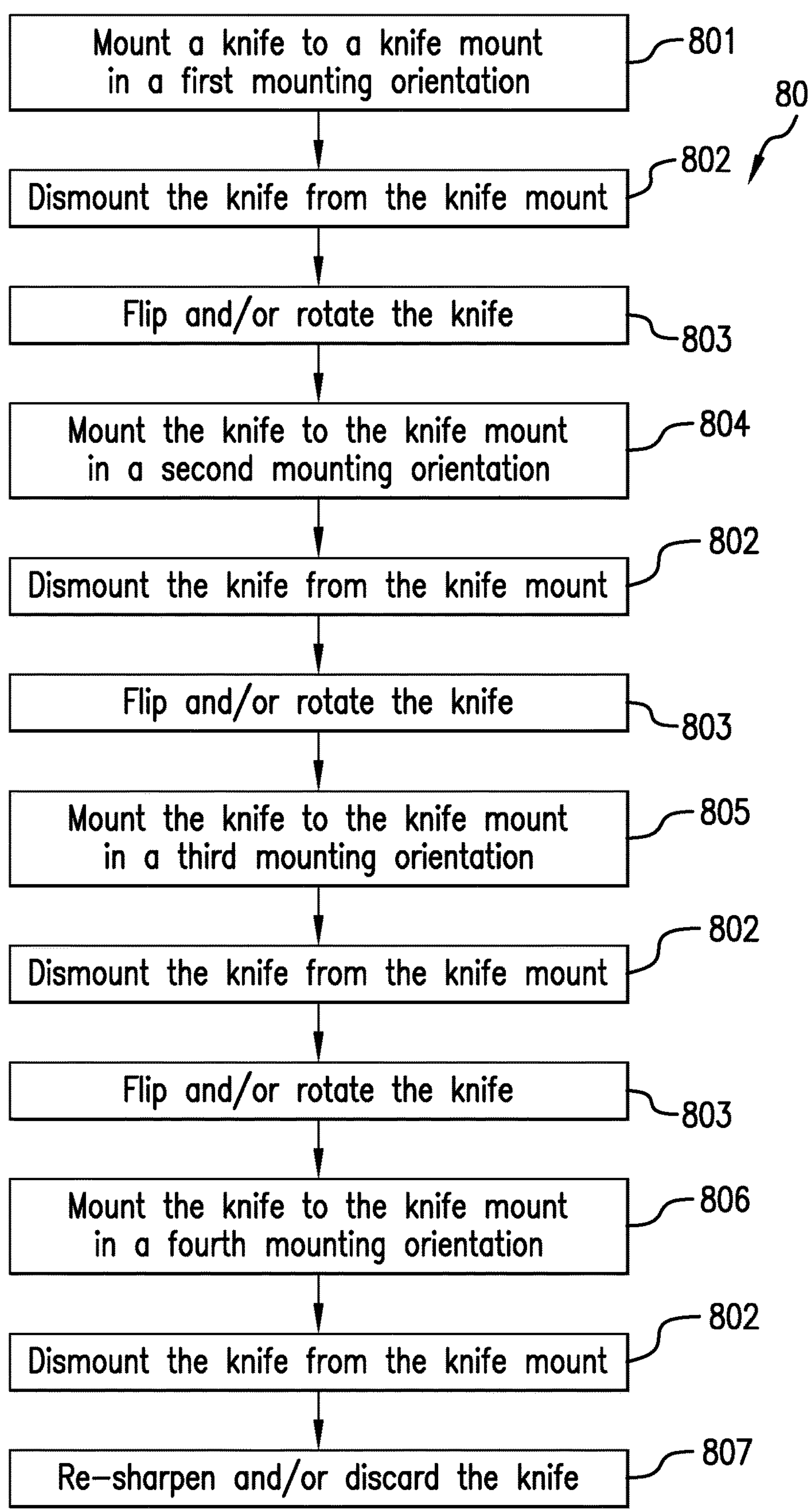
FIG. 8 is a flow chart illustrating an embodiment of a method of mounting and adjusting a knife of a cutting disc provided according to the present disclosure.

Referring now to FIG. 8, an exemplary embodiment of a method 800 of mounting and adjusting the knife 330 provided according to the present disclosure is illustrated. The method 800 includes mounting 801 the knife 330 to the knife mount 320 in a first mounting orientation, which may be any of the orientations illustrated in FIGS. 4-7 and previously described. Mounting 801 the knife 330 to the knife mount 320 may include coupling one of the knife mounting features 411, 421 to the body coupling feature 321. The method 800 further includes dismounting 802 the knife 330 from the knife mount 320 and flipping and/or rotating 803 the knife 330 to a second mounting orientation that differs from the first mounting orientation. The second mounting orientation may be any of the previously described orientations of the knife 330 illustrated in FIGS. 4-7, other than the orientation that is chosen as the first mounting orientation. The knife 330 may then be mounted 804 to the knife mount 320 in the second mounting orientation. Dismounting 802 the knife 330 from the knife mount 320 and flipping and/or rotating 803 the knife 330 may be repeated to then mount 805, 806 the knife 330 in a third mounting orientation and a fourth mounting orientation, respectively. In some embodiments, the first mounting orientation corresponds to the first orientation illustrated in FIG. 4, the second mounting orientation corresponds to the second orientation illustrated in FIG. 5, the third mounting orientation corresponds to the third orientation illustrated in FIG. 6, and the fourth mounting orientation corresponds to the fourth orientation illustrated in FIG. 7. Each mounting orientation of the knife 330 to the knife mount 320 provides a new edge 413, 414, 423, 424 of the knife 330 as the cutting edge. After the knife 330 has been mounted 801, 804, 805, 806 and used, the knife 330 may be re-sharpened and/or discarded 807. It should thus be appreciated that the method 800 provided according to the present disclosure provides a way to mount the knife 330 in a manner that provides four independent cutting edges, which can reduce the need to replace or repair the knife 330.

From the foregoing, it should be appreciated that the knife 330 provided according to the present disclosure may be used in a manner that provides four sharpened cutting edges that can be used before the knife 330 needs to be repaired or replaced. The knife 330 merely needs to be flipped and/or rotated to change the cutting edge, which is both simple and convenient for a farmer to do in the field. In this respect, the knife 330 provided according to the present disclosure can reduce the downtime of the vehicle 100 because the cutting edges can be changed in the field multiple times before the knife 330 must be replaced.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A disc cutter for an agricultural implement, comprising:
- a disc body configured to rotate in a rotation direction;
- a knife mount carried by the disc body and comprising a body mounting feature; and
- a knife coupled to the knife mount, the knife comprising:
  - a first cutting section comprising a first knife mounting feature disposed on or in a first knife surface between a pair of first edges of the first cutting section and configured to couple with the body mounting feature, each of the first edges defining a first cutting angle with respect to the first knife surface such that the first edges extend in parallel;
  - a second cutting section comprising a second knife mounting feature disposed on or in a second knife surface between a pair of second edges of the second cutting section and configured to couple with the body mounting feature, each of the second edges defining a second cutting angle with respect to the second knife surface such that the second edges extend in parallel; and
  - an offset between the first knife surface and the second knife surface such that the first knife surface and the second knife surface are neither co-planar nor parallel, wherein the offset is positioned against the disc body,
  - wherein the first cutting angle and the second cutting angle are the same.

2. The disc cutter of claim 1, wherein the first knife mounting feature and the second knife mounting feature are each openings formed in the respective knife surface.

3. The disc cutter of claim 1, wherein the first knife mounting feature and the second knife mounting feature each define a same size and a same shape.

4. A cutter bar for an agricultural implement, comprising:
- a frame; and
- a plurality of disc cutters carried by the frame, at least one of the disc cutters comprising:
  - a disc body configured to rotate in a rotation direction;
  - a knife mount carried by the disc body and comprising a body mounting feature; and
  - a knife coupled to the knife mount, the knife comprising:
    - a first cutting section comprising a first knife mounting feature disposed on or in a first knife surface between a pair of first edges of the first cutting section and configured to couple with the body mounting feature, each of the first edges defining a first cutting angle with respect to the first knife surface such that the first edges extend in parallel; and
    - a second cutting section comprising a second knife mounting feature disposed on or in a second knife surface between a pair of second edges of the second cutting section and configured to couple with the body mounting feature, each of the second edges defining a second cutting angle with respect to the second knife surface such that the second edges extend in parallel; and an offset between the first knife surface and the second knife surface such that the first knife surface and the second knife surface are neither co-planar nor parallel, wherein the offset is positioned against the disc body, wherein the first cutting angle and the second cutting angle are the same.

5. The cutter bar of claim 4, wherein the first knife mounting feature and the second knife mounting feature are each openings formed in the respective knife surface.

6. The cutter bar of claim 4, wherein the first knife mounting feature and the second knife mounting feature each define a same size and a same shape.

7. An agricultural mowing assembly, comprising:

an agricultural vehicle; and an agricultural implement coupled to the agricultural vehicle, the agricultural implement comprising a cutter bar, the cutter bar comprising:

a frame; and a plurality of disc cutters carried by the frame, at least one of the disc cutters comprising:

a disc body configured to rotate in a rotation direction;

a knife mount carried by the disc body and comprising a body mounting feature; and a knife coupled to the knife mount, the knife comprising:

a first cutting section comprising a first knife mounting feature disposed on or in a first knife surface between a pair of first edges of the first cutting section and configured to couple with the body mounting feature, each of the first edges defining a first cutting angle with respect to the first knife surface such that the first edges extend in parallel;

a second cutting section comprising a second knife mounting feature disposed on or in a second knife surface between a pair of second edges of the second cutting section and configured to couple with the body mounting feature, each of the second edges defining a second cutting angle with respect to the second knife surface such that the second edges extend in parallel; and an offset between the first knife surface and the second knife surface such that the first knife surface and the second knife surface are neither co-planar nor parallel, wherein the offset is positioned against the disc body, wherein the first cutting angle and the second cutting angle are the same.

8. The agricultural mowing assembly of claim 7, wherein the first knife mounting feature and the second knife mounting feature are each openings formed in the respective knife surface.

9. The agricultural mowing assembly of claim 7, wherein the first knife mounting feature and the second knife mounting feature each define a same size and a same shape.

10. The disc cutter of claim 1, wherein the knife includes first and second ends that are defined at opposite ends of the knife, and wherein the pair of first edges, the pair of second edges and the offset are positioned between the first and second ends, and wherein planes defined by and passing through the first and second ends are non-parallel with respect to each other.

11. The cutter bar of claim 4, wherein the knife includes first and second ends that are defined at opposite ends of the knife, and wherein the pair of first edges, the pair of second edges and the offset are positioned between the first and second ends, and wherein planes defined by and passing through the first and second ends are non-parallel with respect to each other.

12. The agricultural mowing assembly of claim 7, wherein the knife includes first and second ends that are defined at opposite ends of the knife, and wherein the pair of first edges, the pair of second edges and the offset are positioned between the first and second ends, and wherein planes defined by and passing through the first and second ends are non-parallel with respect to each other.

13. The disc cutter of claim 2, wherein a longitudinal axis passing through the opening of the first knife mounting feature is non-parallel to a longitudinal axis passing through the opening of the second knife mounting feature.

14. The cutter bar of claim 5, wherein a longitudinal axis passing through the opening of the first knife mounting feature is non-parallel to a longitudinal axis passing through the opening of the second knife mounting feature.

15. The agricultural mowing assembly of claim 8, wherein a longitudinal axis passing through the opening of the first knife mounting feature is non-parallel to a longitudinal axis passing through the opening of the second knife mounting feature.

16. The disc cutter of claim 13, wherein the knife includes first and second ends that are defined at opposite ends of the knife, and wherein the pair of first edges, the pair of second edges, the openings and the offset are positioned between the first and second ends, and wherein the first and second ends are non-parallel.

17. The cutter bar of claim 14, wherein the knife includes first and second ends that are defined at opposite ends of the knife, and wherein the pair of first edges, the pair of second edges, the openings and the offset are positioned between the first and second ends, and wherein the first and second ends are non-parallel.

* * * * *